(12) United States Patent
Hampden

(10) Patent No.: US 6,572,370 B1
(45) Date of Patent: Jun. 3, 2003

(54) HEAT REGULATING UNIT

(76) Inventor: Chris Hampden, 2722 Midland Avenue, Scarborough, Ontario (CA), M1S 1S1

(*) Notice: Subject to any disclaimer, the term of this patent is extended or adjusted under 35 U.S.C. 154(b) by 0 days.

(21) Appl. No.: 10/091,519

(22) Filed: Mar. 7, 2002

(51) Int. Cl.$^7$ .................................................. F27B 5/16
(52) U.S. Cl. ........................ 432/201; 432/65; 432/176; 237/55; 165/901
(58) Field of Search .............................. 432/65, 66, 73, 432/86, 174, 176, 200, 201, 202, 206, 209; 126/99 R, 110 A; 237/55; 165/47, 901

(56) References Cited

U.S. PATENT DOCUMENTS

| | | | | |
|---|---|---|---|---|
| 4,363,353 A | * | 12/1982 | Pranaitis | 165/299 |
| 4,364,514 A | * | 12/1982 | Toporek | 237/55 |
| 4,381,819 A | * | 5/1983 | Paolino | 165/156 |
| 4,448,348 A | * | 5/1984 | Bidwell | 237/55 |
| 4,477,019 A | * | 10/1984 | Breitbach | 236/10 |
| 5,385,299 A | * | 1/1995 | Zawada | 237/55 |

FOREIGN PATENT DOCUMENTS

CA     1271380     7/1990

* cited by examiner

*Primary Examiner*—Gregory Wilson
(74) *Attorney, Agent, or Firm*—Arne I. Fors

(57) ABSTRACT

A forced air heating system has a heat regulating unit assembled therewith, the heating system comprising a furnace having fuel burner and a flue pipe for outlet gases. The heat regulating unit has a metal flue conduit with a flue gas inlet and a flue gas outlet connected to the flue pipe in proximity to the furnace to form a portion of the flue pipe. An elongated casing surrounds the flue conduit and defines with the flue an annulus in which a series of equispaced metal fins extend radially from the flue conduit to the casing to define chambers containing a heat-absorbing material such as metal wool. The heat regulating unit functions as a heat-sink to absorb heat from the hot fuel and a heat source gases for return to the furnace by conduction and convection.

10 Claims, 5 Drawing Sheets

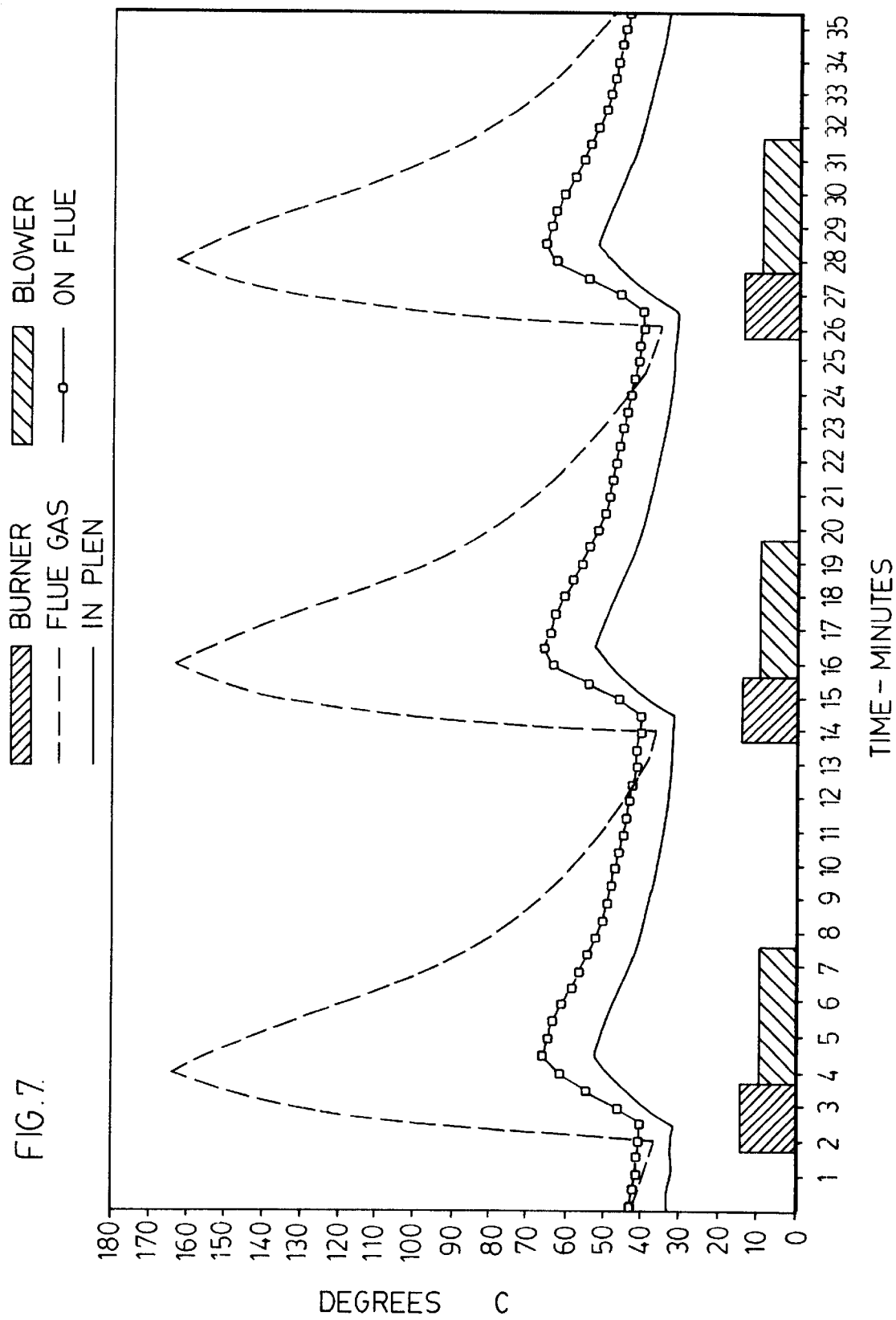

HEAT REGULATING UNIT

BACKGROUND OF THE INVENTION (i) Field of the Invention

This invention relates to heat regulating units for forced air heating systems.

(ii) Description of the Related Art

It is known to recover heat from the flue gases of a forced air heating system having a fuel burner by surrounding the flue pipe with a heat exchanger through which heated air is recycled to the heating system, the air being heated in the heat exchanger by heat recovered from the flue gases. However, such previous known heat exchangers are not particularly efficient and require use of an additional blower to cause air to pass through the heat exchanger.

Also, heating air recycled to the heating system from a heat exchanger in contact with hot flue gases may receive toxic gases such as carbon monoxide if the heat exchanger should leak due, for example, to corrosion.

It is therefore an object of the invention to provide an improved heat regulating unit which does not require use of an additional blower to cause air to pass through the heat exchanger.

Another object of the invention is the provision of a heat regulating unit which does not require the recycle of heating air to obviate the risk of introducing toxic gases to the forced air system.

SUMMARY OF THE INVENTION

According to the invention, a heat recovery unit for a forced air heating system including a furnace having a fuel burner with a flue pipe for discharge of hot outlet combustion flue gases comprises an elongated metal flue conduit with a flue gas inlet and a flue gas outlet adapted to replace a portion of the flue pipe, an elongated casing surrounding the flue conduit defining an annulus between the casing and the flue conduit, and a heat-absorbing material filling said annulus for absorbing heat from hot flue gases during discharge from the furnace, said heat regulating unit being located in the flue pipe in close proximity to the furnace for transfer of heat from the heat regulating unit back to the furnace when the temperature of the heat regulating unit exceeds the temperature of the furnace.

In a preferred embodiment, the heat regulating unit has a series of equispaced metal fins extending radially outwardly from the flue conduit to the casing defining chambers.

The chambers defined by the series of metal fins may contain a heat-absorbing material packing such as steel wool in contact with the fins and the flue conduit so as to be heated thereby and form a heat sink.

BRIEF DESCRIPTION OF THE DRAWINGS

Embodiments of the invention will now be described, by way of example, with reference to the accompanying drawings, in which:

FIG. 7 is a graph illustrating operation of a conventional gas-fired furnace having the heat recovery unit of the invention forming part of the furnace flue.

DESCRIPTION OF THE PREFERRED EMBODIMENT

Figure 1:
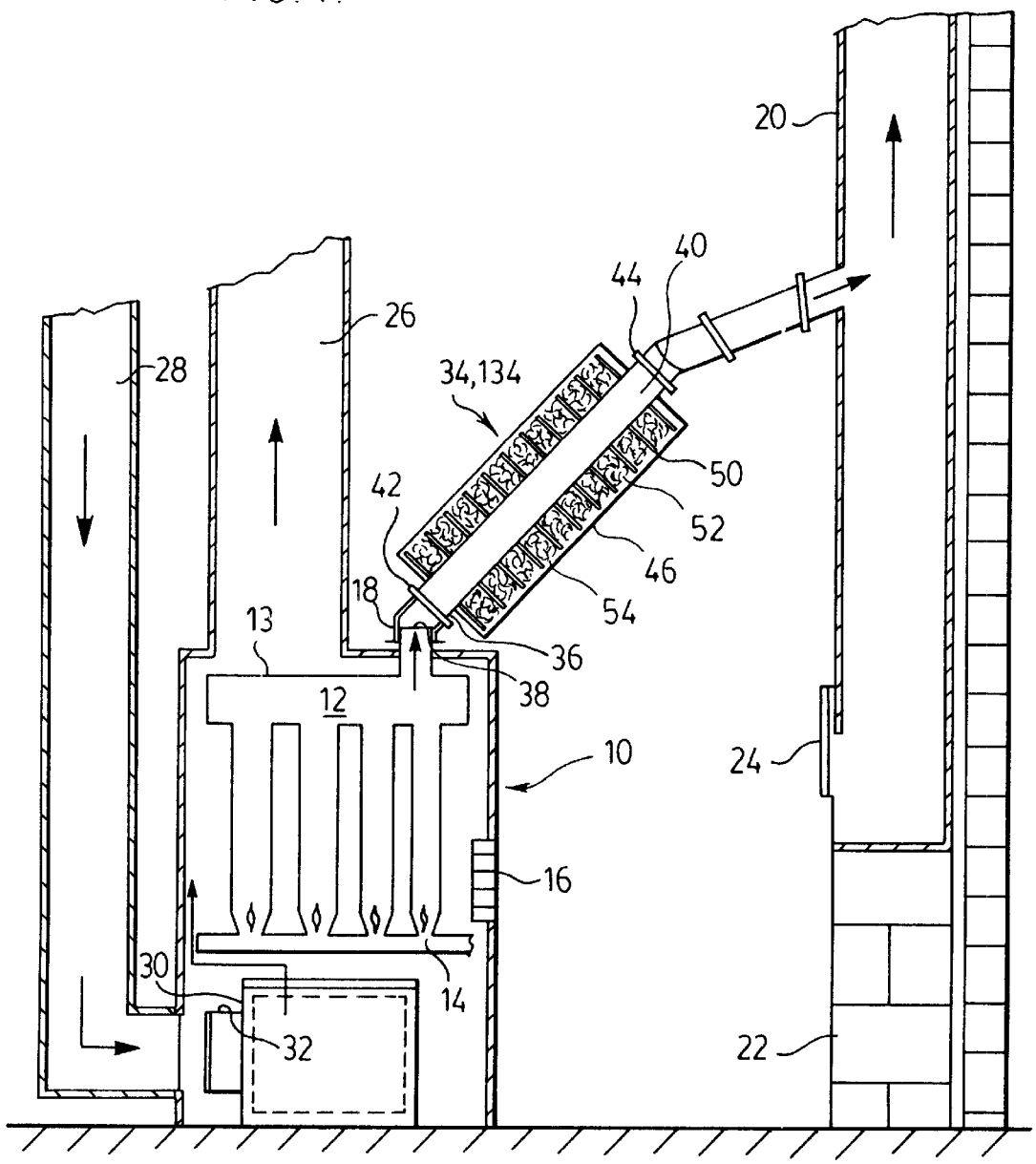
FIG. 1 is a diagrammatic view of a forced air heating system and heat recovery unit in accordance with the invention.

Referring to FIG. 1 of the drawings, a conventional forced air heating system comprises a furnace 10 with a fuel burner 14 in a combustion chamber 12, a draft inlet 16 and a flue pipe 18 which is connected to a main chimney 20 supported by a wall 22 and having a draft inlet 24. The heating system also has a heated air duct 26 which feeds air heated by the furnace heat exchanger 13 to an area where heating is required. A return air duct 28 returns air from the heated area to the furnace 10 from where it is forced by a blower 30 upwardly over the heat-exchanger plenum 13 enclosing combustion chamber 12 for re-heating and subsequent passage to the heated air duct 26, the blower 30 being driven by electric motor 32.

A heat recovery unit 34, 134 in accordance with the invention comprises a metal flue conduit section 36 having a flue gas inlet 38 and a flue gas outlet 40 which in use is connected to form a portion of the flue pipe 18, after removal of the previously existing section, the connection being effected by conventional flue pipe connectors 42, 44. An elongated casing 46 of round or rectangular section surrounds the flue conduit 36 and may be secured thereto in any suitable manner, for example by being formed in two parts secured together around the flue conduit 36 by rivets 48 as typified by the embodiment in FIGS. 4 and 5. Alternatively, the casing 46 may be of circular section as typified in FIGS. 2 and 3.

Figure 4:
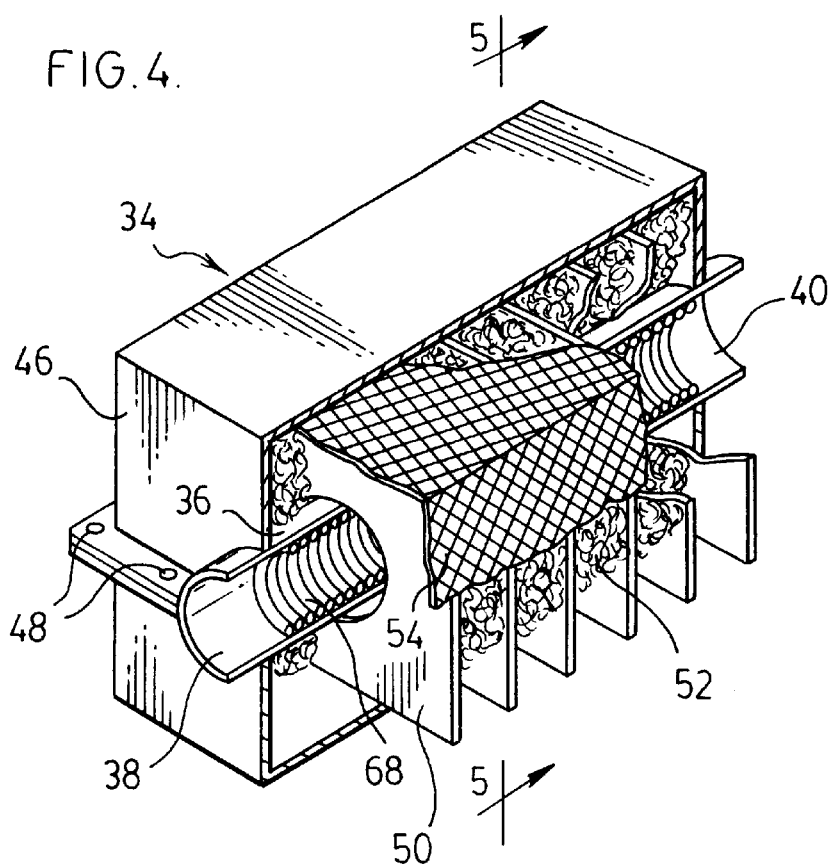
FIG. 4 is a perspective view, partly cut away, of another embodiment of the invention.
Figure 5:
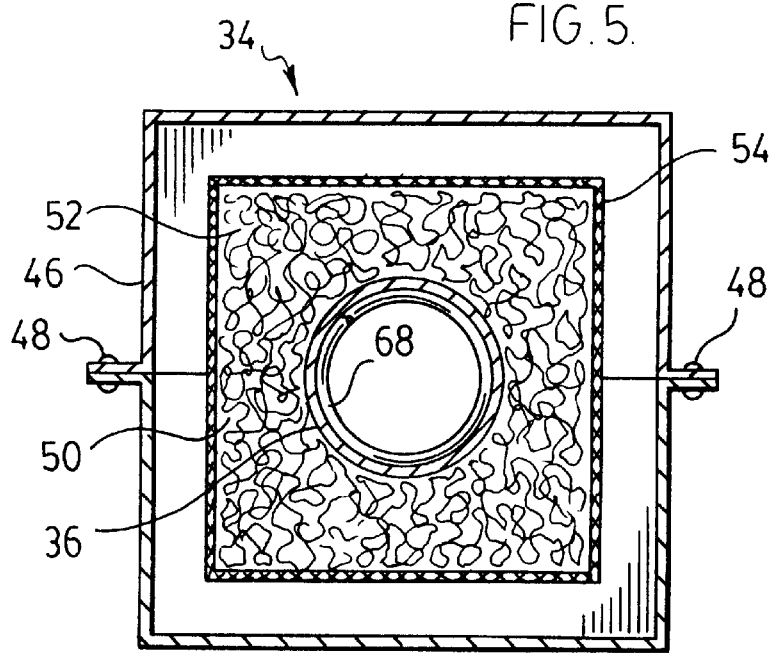
FIG. 5 is a sectional view taken along line 5—5 of FIG. 4.

With reference to FIGS. 4 and 5, the flue conduit 36 has a series of fins 50 extending radially outwardly from its external surface and which are longitudinally equispaced along the length of the conduit 36 within the casing 46. The fins 50 extend almost to the inner surface of the casing 46 as illustrated, or may extend to abut the said inner surface. The chambers defined between the fins 50 contain a metal wool such as steel wool 52, the metal wool 52 engaging the fins 50 and the flue conduit 36. The metal wool preferably is retained in place by a perforated metal sleeve 54 surrounding the fins 50 if not abutting the inner surface of the casing 46.

Figure 2:
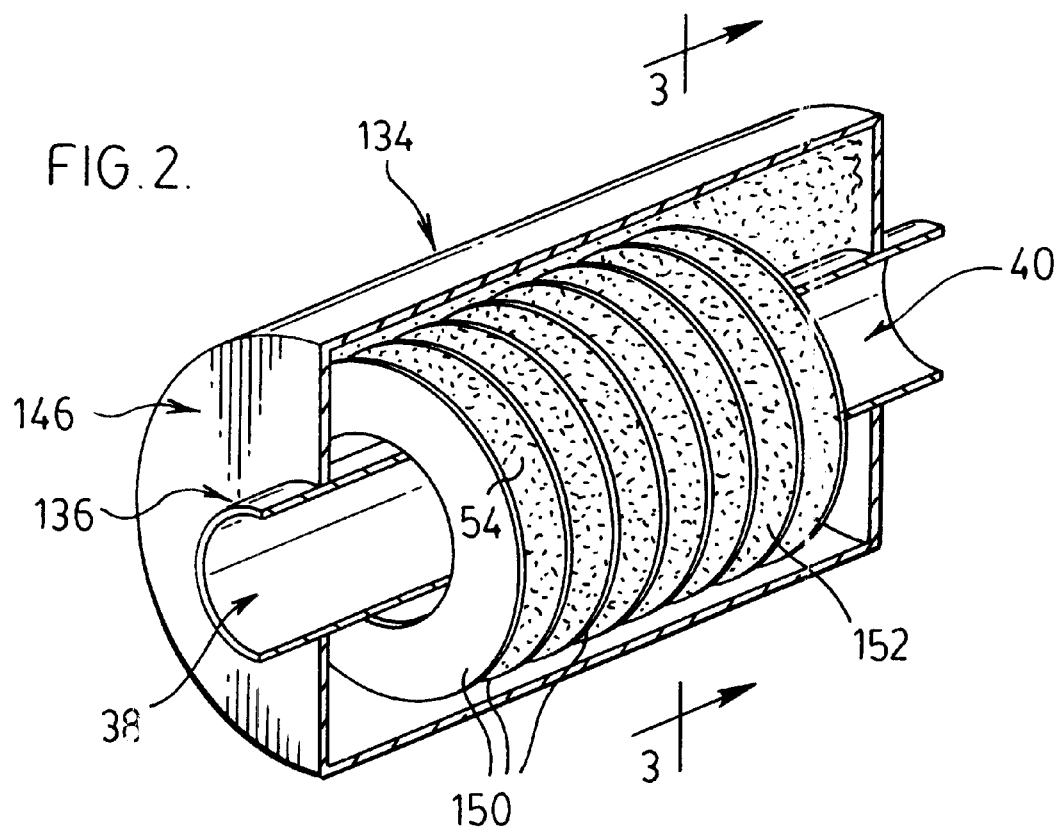
FIG. 2 is a perspective view, partly cut away, of the heat recovery unit shown in FIG. 1.
Figure 3:
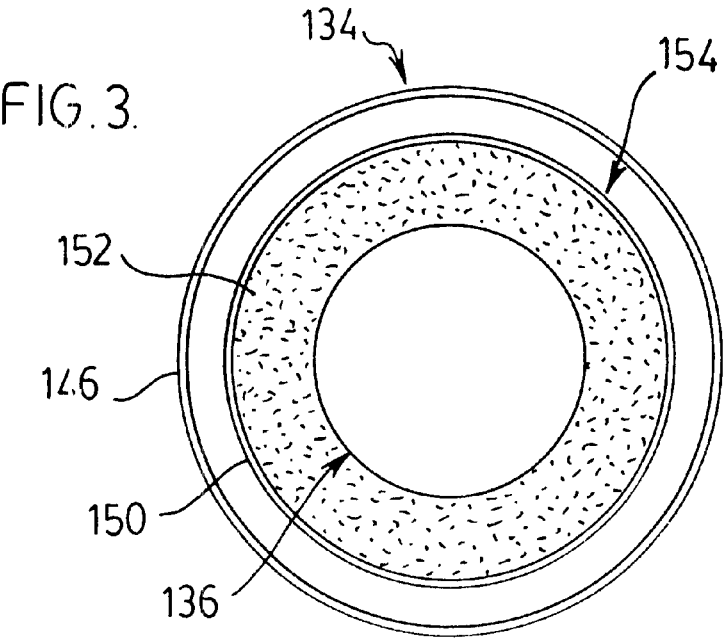
FIG. 3 is a sectional view along line 3—3 of FIG. 2.

With reference now to FIGS. 2 and 3, the flue conduit 136 has a series of fins 150 extending radially outwardly from its external surface and which are longitudinally equispaced along the length of the conduit 136 within the casing 146. The fins 150 extend almost to the inner surface of the casing 146, and the chambers defined between the fins 150 contain a heat-absorbing material such as steel wool 152, the steel wool 152 engaging the fins 150 and the flue conduit 136. The metal wool preferably is retained in place by a perforated metal sleeve 154 surrounding the fins 150.

The heat regulating unit 34 or 134 is supplied as a unit as shown in FIG. 2 or 4, and can readily be assembled as indicated in FIG. 1 by removing an appropriate section of the flue pipe 18, and installing the unit 34, 134 in its place with connectors 42, 44 at opposite ends of the flue conduit 36.

The heat regulating unit 34, 134 is located in proximity to furnace 10, preferably as close as practicable, in thermal communication with heat-exchanger plenum 13 by metal flue pipe 18. During the combustion phase of a heating cycle with the burner on, hot combustion gases produced by burner 14 in combustion chamber 12 heat furnace plenum 13 and exit through flue pipe 18 to chimney 20. A substantial portion of the heat in the flue gases otherwise lost is absorbed by the metal flue conduit, metal fins and metal wool of the heat regulating units 34, 134, raising the temperature of the heat regulating unit to about 120 to 140° C.

Upon cessation of the combustion phase of the heating cycle, the furnace blower 30 continues to operate until the furnace plenum cools to about 85° C., at which time the blower is switched off.

The presence of the heat regulating unit, which acts as a heat source in proximity to the furnace, permits heat transfer from the heat source back to the furnace heat exchanger upon cooling of the exchanger below the temperature of the heat regulating unit. The rate of cooling of the heat exchanger thus is reduced and the operation of the furnace blower is extended to utilize the heat stored in the heat regulating unit. In addition, heat transferred from the heat source to the furnace heat exchanger during the furnace off-cycle permits the furnace blower on-temperature to be reached sooner.

EXAMPLE

An installation of a heat regulating installation shown in FIGS. 1–3 was tested with a Findlay 140,000 BTU conventional gas-fired furnace. The outside temperature was −2° C. and the wind speed was 15 to 20 km/h. A comparative test was conducted under the same conditions with the Findlay 140,000 BTU furnace without the heat recovery system.

Figure 6:
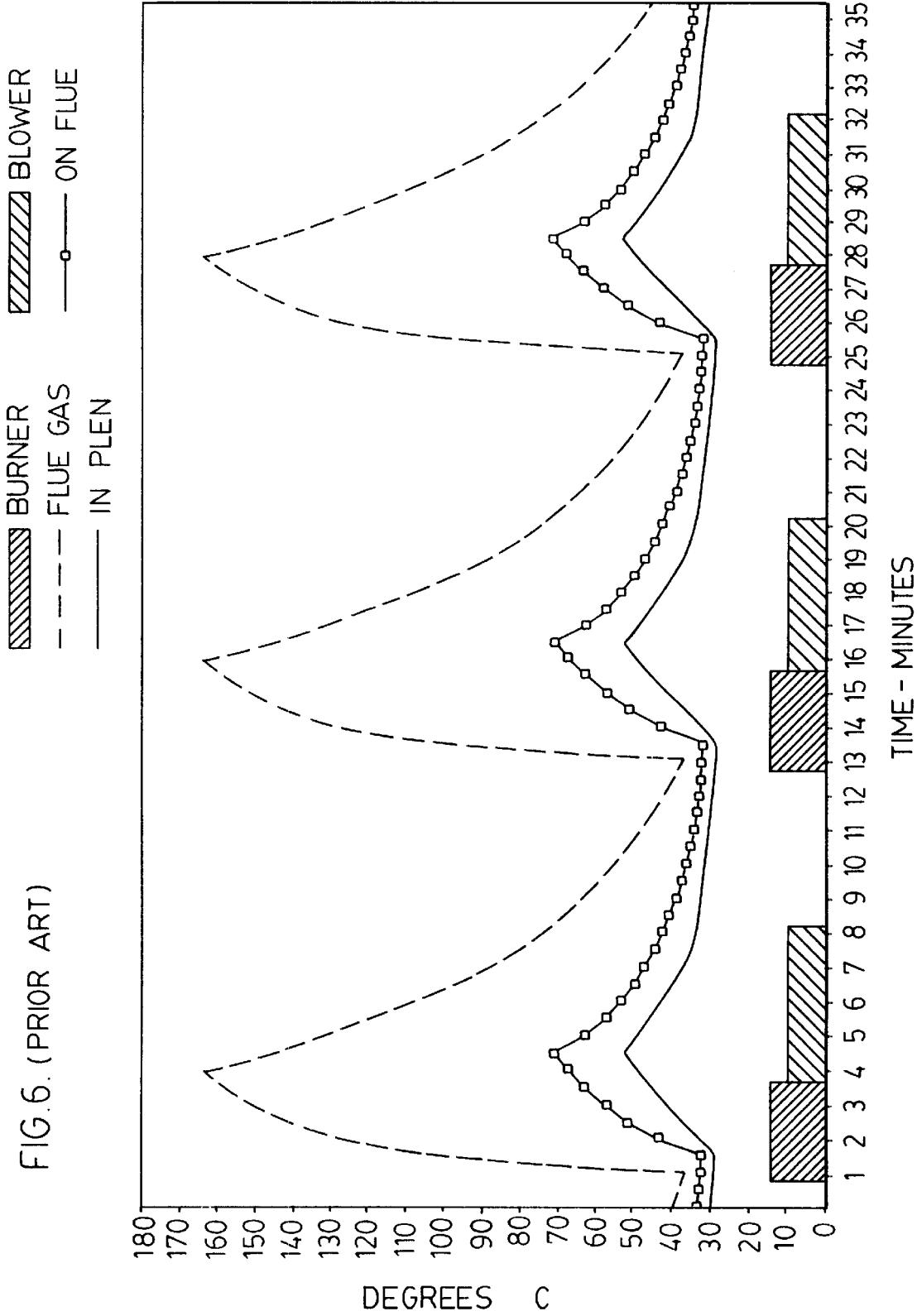
FIG. 6 is a graph illustrating operation of a conventional gas-fired hot air furnace.

FIG. 6 illustrates burner time and blower time on and off in 12-minute cycles for the Findlay furnace without the heat recovery system. The burner fired on for three minutes and was off for nine minutes, with the blower on for about five minutes of the cycle. FIG. 7 illustrates burner and blower time on and off for the 12-minute cycle for the Findlay furnace having the heat regulating unit installed. The burner fired for only two minutes and was off for 10 minutes, with the blower on for about four minutes of the cycle.

The heat regulating unit of the invention provides a number of important advantages. Apart from the initial cost of the unit and its installation, no further cost is incurred. The unit functions as a passive heat sink to recover heat from discharging hot combustion gases, stores the heat during the combustion cycle and during operation of the blower until the temperature of the furnace heat exchanger drops below the temperature of the heat regulating unit, and then transfers heat back to the furnace heat exchanger to continue heating the forced air. The furnace components are maintained at a higher average temperature during the heating cycle, thereby minimizing condensation and corrosion. Operation of the combustion phase for about two-thirds of the normal combustion phase of the heating cycle results in substantial savings in fuel costs and significant reduction in air pollution.

It will be understood, of course, that modifications can be made in the embodiments of the invention described herein without departing from the scope and purview of the invention as defined by the appended claims.

What is claimed is:

1. A heat regulating unit for a forced air heating system including a furnace having a fuel burner in a heat exchanger with a metal flue pipe for discharge of hot outlet combustion flue gases comprising an elongated metal flue conduit with a flue gas inlet and a flue gas outlet adapted to replace a portion of the metal flue pipe, an elongated casing surrounding the flue conduit defining an annulus between the casing and the flue conduit, and a metal heat-absorbing material filling said annulus for absorbing heat from hot flu gases during discharge from the furnace, said heat regulating unit being located in proximity to the furnace in series with the metal flue pipe and in thermal communication with the furnace heat exchanger for transfer of heat from the heat recovery unit back to the furnace when the temperature of the heat recovery unit exceeds the temperature of the furnace heat exchanger.

2. A heat regulating unit as claimed in claim 1, in which the heat-absorbing material comprises a series of equispaced metal fins extending radially outwardly from the flue conduit to the casing or in proximity to the casing defining chambers between the metal fins.

3. A heat regulating unit as claimed in claim 2, in which the chambers defined by the series of metal fins contain metal wool packing in contact with the fins and the flue conduit so as to be heated thereby and form a heat sink.

4. A heat regulating unit as claimed in claim 3, in which the metal wool is steel wool.

5. A heat regulating unit as claimed in claim 3, in which the elongated casing is cylindrical in shape.

6. A heat regulating unit as claimed in claim 3, in which the elongated casing is rectangular in cross-section.

7. A forced air heating system comprising a furnace having a fuel burner in a heat exchanger with a metal flue pipe for discharge of hot outlet combustion flue gases comprising an elongated metal flue conduit with a flue gas inlet and a flue gas outlet adapted to replace a portion of the metal flue pipe, an elongated casing surrounding the flue conduit defining an annulus between the casing and the flue conduit, and a metal heat-absorbing material filling said annulus for absorbing heat from hot flue gases during discharge from the furnace, said heat regulating unit being located in proximity to the furnace in series for transfer of heat from the heat recovery unit back to the furnace when the temperature of the heat recovery unit exceeds the temperature of the furnace heat exchanger.

8. A forced air heating system as claimed in claim 7, in which the heat-absorbing material comprises a series of equispaced metal fins extending radially outwardly from the flue conduit to the casing or in proximity to the casing defining chambers between the metal fins.

9. A forced air heating system as claimed in claim 8, in which the chambers defined by the series of metal fins contain metal wool packing in contact with the fins and the flue conduit so as to be heated thereby and form a heat sink.

10. A forced air heating system as claimed in claim 9, in which the metal wool is steel wool.

\* \* \* \* \*